US011868081B2

(12) United States Patent
Kyotani et al.

(10) Patent No.: US 11,868,081 B2
(45) Date of Patent: Jan. 9, 2024

(54) IMAGE FORMING APPARATUS CAPABLE OF DETERMINING WHETHER COMMUNICATION BETWEEN CONTROLLER AND STORAGE MEDIUM OF DEVELOPING CARTRIDGE IS ESTABLISHED

(71) Applicant: BROTHER KOGYO KABUSHIKI KAISHA, Nagoya (JP)

(72) Inventors: Tadao Kyotani, Nagoya (JP); Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/053,102

(22) Filed: Nov. 7, 2022

(65) Prior Publication Data

US 2023/0114766 A1 Apr. 13, 2023

Related U.S. Application Data

(63) Continuation of application No. 17/372,811, filed on Jul. 12, 2021, now Pat. No. 11,507,015.

(30) Foreign Application Priority Data

Jul. 15, 2020 (JP) ................................ 2020-121022

(51) Int. Cl.
*G03G 15/00* (2006.01)
*G03G 21/16* (2006.01)

(52) U.S. Cl.
CPC ..... *G03G 21/1652* (2013.01); *G03G 21/1676* (2013.01)

(58) Field of Classification Search
CPC ....................... G03G 15/1652; G03G 15/1676
(Continued)

(56) References Cited

U.S. PATENT DOCUMENTS 10,025,264 B1 7/2018 Itabashi
10,254,708 B2 4/2019 Itabashi
(Continued)

FOREIGN PATENT DOCUMENTS

JP 2005-62606 A 3/2005
JP 2005-164646 A 6/2005
(Continued)

OTHER PUBLICATIONS

International Search Report and Written Opinion issued in corresponding International Patent Application No. PCT/JP2021/026021, dated Sep. 7, 2021.

*Primary Examiner* — Hoan H Tran
(74) *Attorney, Agent, or Firm* — Merchant & Gould P.C.

(57) ABSTRACT

An image forming apparatus includes: a main frame; a developing cartridge including a casing, a storage medium having an electrical contact surface, and developing roller; a photosensitive drum contactable with the developing roller; an electrical connector contactable with the electrical contact surface; a separation mechanism; and a controller configured to communicate with the storage medium via the electrical connector. The separation mechanism is configured to move the casing relative to the main frame in a separating direction in which the developing roller separates from the photosensitive drum. The controller is configured to perform: moving, by controlling the separation mechanism, the casing relative to the main frame in the separating direction; determining, in response to performing the moving, whether communication with the storage medium is established; and outputting, when determining in the determining that the communication with the storage medium is not established, an error.

9 Claims, 12 Drawing Sheets

(58) Field of Classification Search
USPC .......................................... 399/90, 107, 111
See application file for complete search history.

(56) References Cited

U.S. PATENT DOCUMENTS

| | | | |
|---|---|---|---|
| 2015/0261181 | A1 | 9/2015 | Moon et al. |
| 2017/0269543 | A1 | 9/2017 | Itabashi |
| 2019/0196394 | A1 | 6/2019 | Yabuki et al. |
| 2021/0011395 | A1 | 1/2021 | Itabashi |

FOREIGN PATENT DOCUMENTS

| | | | | |
|---|---|---|---|---|
| JP | 2007-34227 | A | | 2/2007 |
| JP | 2008242267 | | * | 10/2008 |
| JP | 2016-142856 | A | | 8/2016 |
| JP | 2017-167448 | A | | 9/2017 |
| JP | 2018-45045 | A | | 3/2018 |
| JP | 2019-179138 | A | | 10/2019 |
| JP | 2020-160280 | A | | 10/2020 |

* cited by examiner

IMAGE FORMING APPARATUS CAPABLE OF DETERMINING WHETHER COMMUNICATION BETWEEN CONTROLLER AND STORAGE MEDIUM OF DEVELOPING CARTRIDGE IS ESTABLISHED

CROSS REFERENCE TO RELATED APPLICATION

This application is a continuation of U.S. patent application Ser. No. 17/372,811, filed Jul. 12, 2021, which claims priority from Japanese Patent Application No. 2020-121022 filed Jul. 15, 2020. The entire content of the aforementioned applications is incorporated herein by reference.

TECHNICAL FIELD

The present disclosure relates to an image forming apparatus.

BACKGROUND

There has been known an electro-photographic type image forming apparatus such as a laser printer and an LED printer. The image forming apparatus includes a developing cartridge. The developing cartridge is attachable to a main frame of the image forming apparatus. The developing cartridge includes a developing roller for supplying toner. The developing roller makes contact with a photosensitive drum in the image forming apparatus when the developing cartridge is attached to the main frame of the image forming apparatus.

The conventional image forming apparatus including the developing cartridge is disclosed in a prior art. The developing cartridge disclosed in the prior art includes an IC chip having an electrical contact surface. Upon attachment of the developing cartridge to the main frame of the image forming apparatus, the electrical contact surface makes contact with an electrical connector in the main frame of the image forming apparatus.

In such an image forming apparatus disclosed in the prior art, a separation process for separating the developing roller from the photosensitive drum can be performed. Further, in the developing cartridge disclosed in the prior art, a holder for holding the IC chip is movable relative to a casing of the developing cartridge. With this configuration, a state where the electrical contact surface of the IC chip and the electrical connector is in contact with each other can be maintained even when the separation process is performed.

SUMMARY

However, there is a likelihood that the electrical contact surface of the IC chip unintentionally separates from the electrical connector at the time of performing the separation process in a case where movement of the holder relative to the casing of the developing cartridge is not normal, or in a case where a mechanism for performing the separation process does not operate normally.

In view of the foregoing, it is an object of the present disclosure to provide an image forming apparatus in which an error can be outputted when connection between an electrical contact surface of an IC chip and an electrical connector is not normal in a state where a separation mechanism is operated.

In order to attain the above and other objects, according to one aspect, the present disclosure provides an image forming apparatus including: a main frame; a developing cartridge; a photosensitive drum; an electrical connector; a separation mechanism; and a controller. The developing cartridge is attachable to the main frame. The developing cartridge includes: a casing; a storage medium; and developing roller. The casing is configured to accommodate developing agent therein. The storage medium has an electrical contact surface. The developing roller is movable together with the casing. The photosensitive drum is contactable with the developing roller in a state where the developing cartridge is attached to the main frame. The electrical connector is contactable with the electrical contact surface in the state where the developing cartridge is attached to the main frame. The separation mechanism is configured to move the casing relative to the main frame in a separating direction in which the developing roller separates from the photosensitive drum. The controller is configured to control the separation mechanism. The controller is configured to communicate with the storage medium via the electrical connector in the state where the developing cartridge is attached to the main frame. The controller is configured to perform: moving, by controlling the separation mechanism, the casing relative to the main frame in the separating direction; determining, in response to performing the moving, whether communication with the storage medium is established; and outputting, when determining in the determining that the communication with the storage medium is not established, an error.

According to another aspect, the present disclosure also provides an image forming apparatus including: a main frame; a developing cartridge; a photosensitive drum; an electrical connector; a separation mechanism; and a controller. The developing cartridge is attachable to the main frame. The developing cartridge includes: a casing; a storage medium; and developing roller. The casing is configured to accommodate developing agent therein. The storage medium has an electrical contact surface. The developing roller is movable together with the casing. The photosensitive drum is contactable with the developing roller in a state where the developing cartridge is attached to the main frame. The electrical connector is contactable with the electrical contact surface in the state where the developing cartridge is attached to the main frame. The separation mechanism is configured to move the casing relative to the main frame in a separating direction in which the developing roller separates from the photosensitive drum. The controller is configured to control the separation mechanism. The controller is configured to communicate with the storage medium via the electrical connector in the state where the developing cartridge is attached to the main frame. The controller is configured to perform: moving, by controlling the separation mechanism, the casing relative to the main frame in the separating direction; and determining, in response to performing the moving, whether communication with the storage medium is established in a state where the developing roller is in separation from the photosensitive drum.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1:
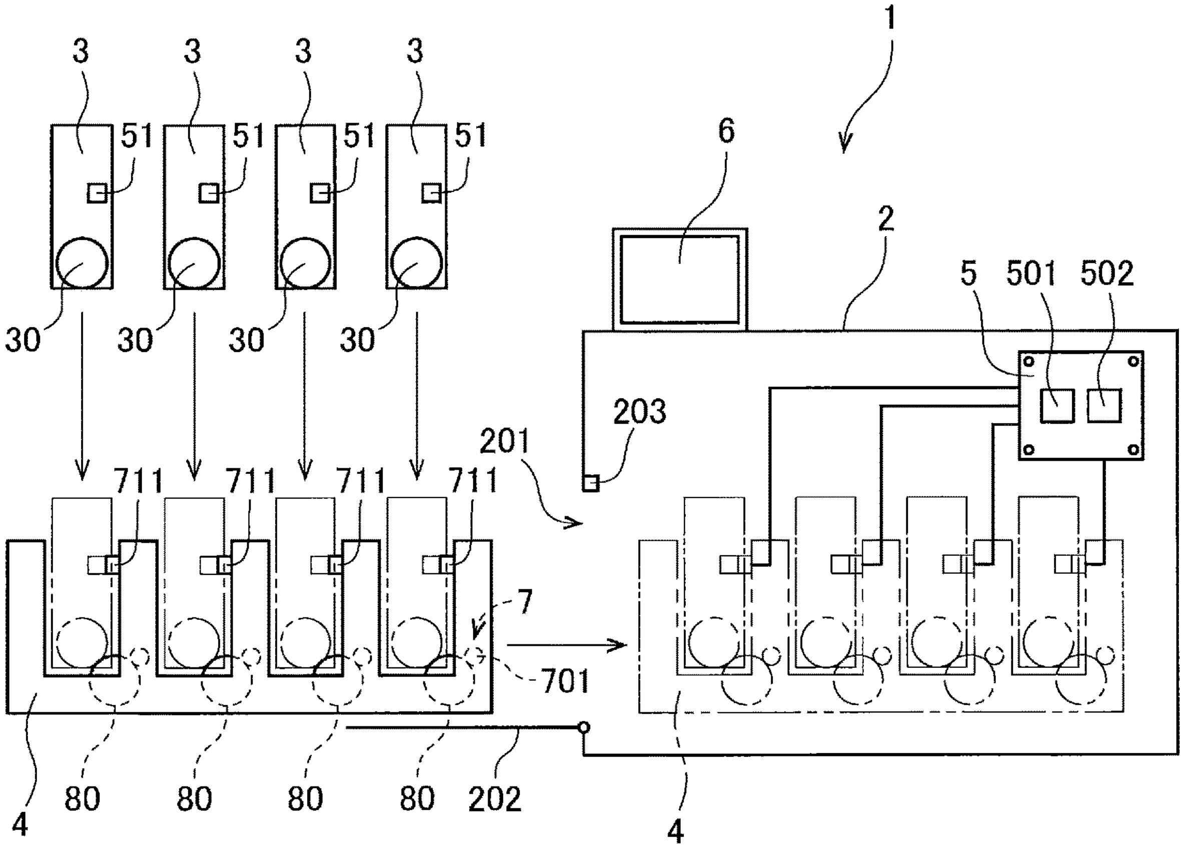
FIG. 1 is a schematic diagram of an image forming apparatus according to one embodiment of the present disclosure.

Hereinafter, an image forming apparatus 1 according to one embodiment of the present disclosure will be described with reference to the accompanying drawings.

In the following description, a direction in which a developing roller 30 (see FIG. 3) extends will be referred to as "first direction". A direction crossing an electrical contact surface 511 of an IC chip 51 (see FIG. 5) will be referred to as "second direction". In the present embodiment, the second direction is perpendicular to the electrical contact surface 511. Further, a direction in which a developing cartridge 3 is inserted into a corresponding slot 79 (see FIG. 6) of a drum cartridge 4 will be referred to as "third direction".

<1. Configuration of Image Forming Apparatus>

FIG. 1 is a schematic diagram of the image forming apparatus 1. The image forming apparatus 1 is an electrophotographic type printer such as a laser printer and an LED printer. The image forming apparatus 1 includes a main frame 2, four developing cartridges 3, the drum cartridge 4, a controller 5, a display 6, and a cleaning unit 7.

The main frame 2 has an insertion opening 201, and includes a cover 202. The cover 202 is pivotally movable between an open position (see FIG. 1) where the cover 202 opens the insertion opening 201 and a closed position where the cover 202 closes the insertion opening 201. The image forming apparatus 1 further includes a cover sensor 203 configured to detect pivotal movement of the cover 202 from the open position to the closed position. The cover sensor 203 is configured to transmit detection signal to the controller 5 when the cover sensor 203 detects that the cover 202 is moved from the open position to the closed position.

Figure 2:
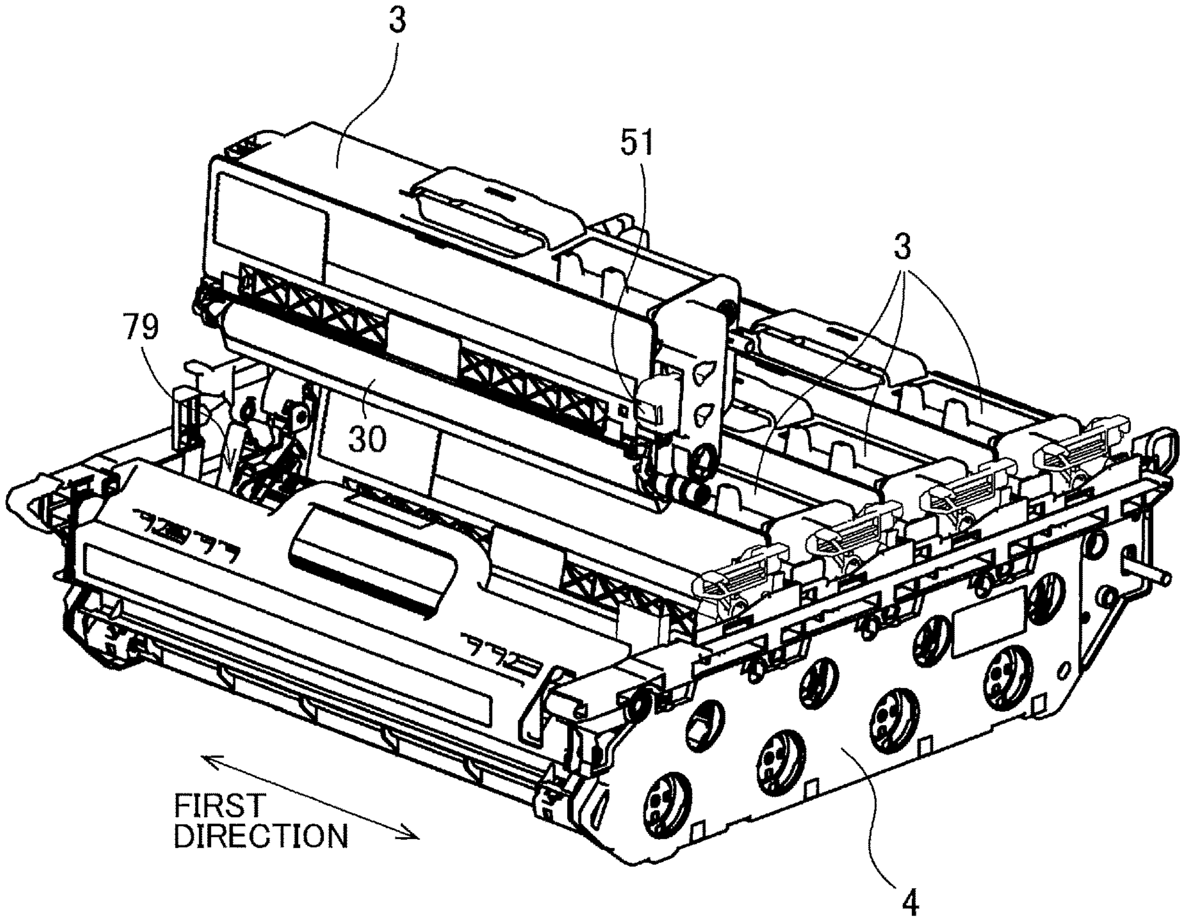
FIG. 2 is a perspective view of a developing cartridge and a drum cartridge in the image forming apparatus according to the embodiment.

FIG. 2 is a perspective view of the four developing cartridges 3 and the drum cartridge 4. As illustrated in FIGS. 1 and 2, each of the four developing cartridges 3 is individually attachable to the drum cartridge 4. Further, the drum cartridge 4 to which the four developing cartridges 3 are attached is attachable to the main frame 2 through the insertion opening 201. That is, the four developing cartridges 3 are attachable to the main frame 2 while these developing cartridges 3 are attached to the drum cartridge 4.

Each of the four developing cartridges 3 includes the developing roller 30. The drum cartridge 4 includes four photosensitive drums 80. When each of the developing cartridges 3 are attached to the drum cartridge 4, the developing roller 30 of each of the developing cartridges 3 is contactable with a corresponding one of the photosensitive drums 80. The four developing cartridges 3 accommodate therein developing agents of colors different from one another (for example, cyan, magenta, yellow, and black). The image forming apparatus 1 is configured to form an image on a printing sheet using the developing agents supplied from the four developing cartridges 3 through the developing rollers 30 and the photosensitive drums 80.

In the present embodiment, the number of developing cartridges 3 attachable to the drum cartridge 4 is four. However, the number of developing cartridges 3 attachable to the drum cartridge 4 may be one to three, or not less than five.

The controller 5 is positioned inside the main frame 2 of the image forming apparatus 1. The controller 5 includes, for example, a processor 501 such as CPU, and a main memory 502. The main memory 502 is a storage medium from which information is readable and to which information is writable. The processor 501 is configured to read information from the main memory 502 and write information to the main memory 502. The controller 5 is configured to perform various processes in the image forming apparatus 1 by operating the processor 501 in accordance with programs stored in the main memory 502.

As illustrated in FIG. 1, each of the four developing cartridges 3 includes the IC chip 51. Each of the IC chips 51 is a storage medium from which information is readable and to which information is writable. Further, the drum cartridge 4 includes four electrical connectors 711. Each of the IC chips 51 is electrically connected to a corresponding one of the electrical connectors 711 when each of the developing cartridges 3 is attached to the drum cartridge 4.

Further, in a state where the drum cartridge 4 to which the developing cartridges 3 are attached is attached to the main frame 2, the electrical connectors 711 are electrically connected to the controller 5. Accordingly, the IC chips 51 of the developing cartridges 3 are electrically connected to the controller 5 through the corresponding electrical connectors 711. That is, the controller 5 is configured to communicate with the IC chips 51 to perform reading information from the IC chips 51 and writing information to the IC chips 51.

The display 6 is a liquid crystal display or an organic electroluminescence display, for example. The display 6 is electrically connected to the controller 5. The display 6 is configured to display on a screen various information relating operations performed in the image forming apparatus 1 in response to instructions transmitted from the controller 5.

The cleaning unit 7 is configured to clean the four photosensitive drums 80 of the drum cartridge 4. In the present embodiment, the drum cartridge 4 includes the cleaning unit 7. The cleaning unit 7 includes a plurality of cleaning rollers 701 and a motor (not illustrated) for rotating the cleaning rollers 701. The motor is electrically connected to the controller 5 in an attached state of the drum cartridge 4 to the main frame 2.

The controller 5 controls the cleaning unit 7 to perform a cleaning process to clean the photosensitive drums 80 each time the controller 5 executes printing operations for the prescribed number of sheets. Further, the controller 5 also controls the cleaning unit 7 to perform the cleaning process when the controller 5 ends a printing operation. In order to perform the cleaning process, the controller 5 controls the cleaning unit 7 so that outer circumferential surfaces of the cleaning rollers 701 make contact with outer circumferential surfaces of the corresponding photosensitive drums 80 and the cleaning rollers 701 rotate by the motor. Hence, unnecessary developing agent adhered to the outer circumferential surfaces of the photosensitive drums 80 can be removed.

<2. Configuration of Developing Cartridge>

Figure 3:
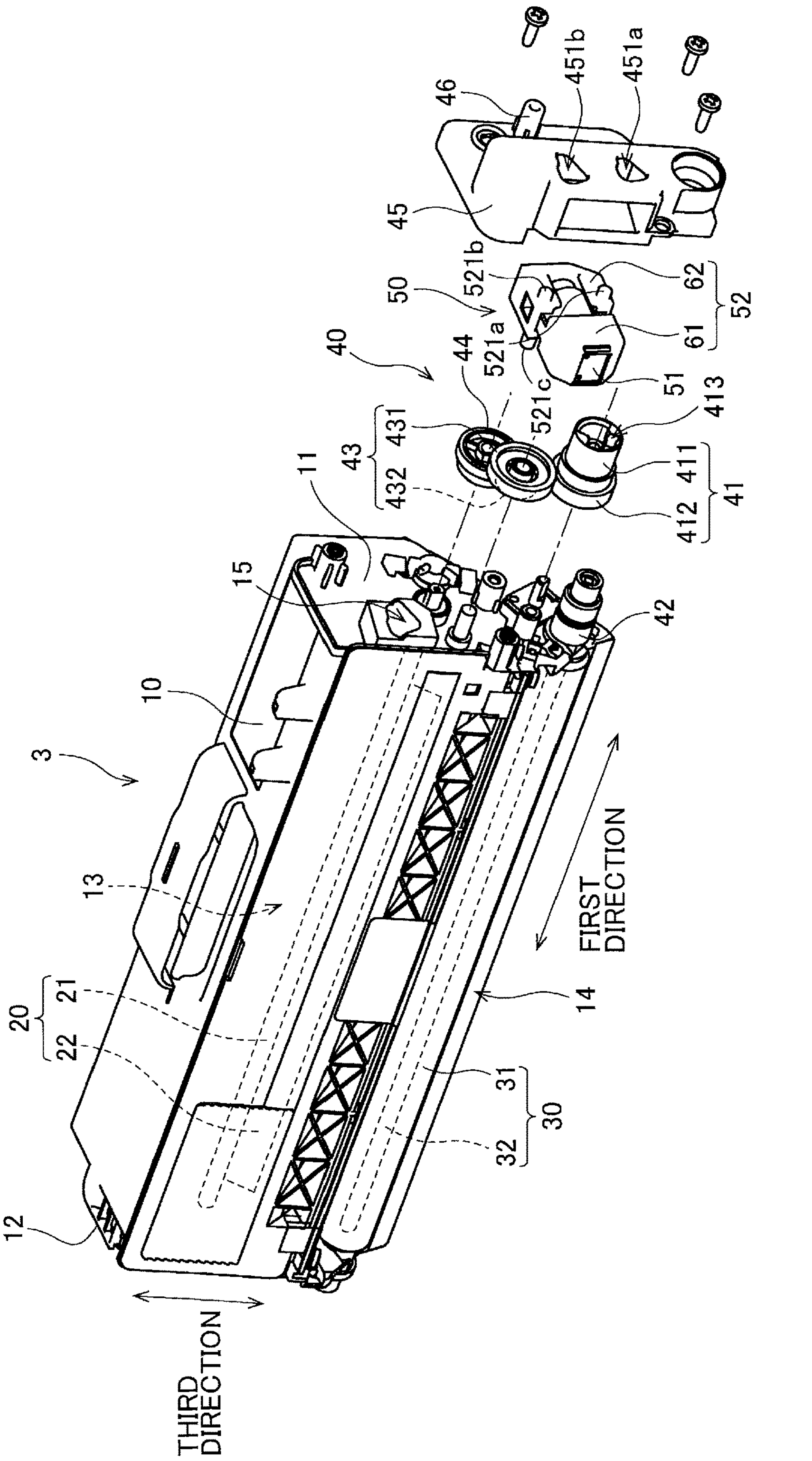
FIG. 3 is a perspective view of the developing cartridge in the image forming apparatus according to the embodiment in which a portion of the developing cartridge is exploded.

FIG. 3 is a perspective view of the developing cartridge 3. As illustrated in FIG. 3, the developing cartridge 3 according to the present embodiment includes a casing 10, an agitator 20, the developing roller 30, a gear portion 40, and an IC chip assembly 50. Note that FIG. 3 illustrates a state where the gear portion 40 and the IC chip assembly 50 is exploded.

The casing 10 is configured to accommodate the developing agent therein. The casing 10 has a first end surface 11 and a second end surface 12, and extends in the first direction between the first end surface 11 and the second end surface 12. The gear portion 40 and the IC chip assembly 50 are positioned at the first end surface 11. An accommodation chamber 13 in which the developing agent is accommodated is formed inside the casing 10. Further, the casing 10 has an opening portion 14 positioned at one end in the third direction of the casing 10. The accommodation chamber 13 is in communication with an outside of the casing 10 through the opening portion 14.

The agitator 20 includes an agitator shaft 21, and an agitating blade 22. The agitator shaft 21 extends in the first direction. The agitating blade 22 expands radially outward from the agitator shaft 21. The agitating blade 22 and at least a portion of the agitator shaft 21 are disposed inside the accommodation chamber 13. An agitator gear 44 (described later) is coupled to one end in the first direction of the agitator shaft 21. Therefore, the agitator shaft 21 and the agitating blade 22 rotate together with rotation of the agitator gear 44. As the agitating blade 22 rotates, developing agent inside the accommodation chamber 13 is agitated.

The developing roller 30 is a roller rotatable about a rotational axis extending in the first direction. The developing roller 30 is positioned at the opening portion 14 of the casing 10. In the present embodiment, the developing roller 30 includes a developing roller body 31 and a developing roller shaft 32. The developing roller body 31 has a hollow cylindrical shape and extends in the first direction. The developing roller body 31 is made of rubber having elasticity, for example. The developing roller shaft 32 is a solid cylindrical member that penetrates the developing roller body 31 in the first direction. The developing roller shaft 32 is made of metal or electric conductive resin. The developing roller body 31 is fixed to the developing roller shaft 32 so as not to rotate relative to the developing roller shaft 32.

A developing roller gear 42 (described later) is coupled to one end in the first direction of the developing roller shaft 32. Hence, when the developing roller gear 42 rotates, the developing roller shaft 32 rotates and the developing roller body 31 also rotates together with the developing roller shaft 32.

Note that the developing roller shaft 32 need not penetrate the developing roller body 31 in the first direction. For example, one developing roller shaft 32 may extend in the first direction from each end in the first direction of the developing roller body 31.

The developing cartridge 3 also includes a supply roller (not illustrated). The supply roller is positioned between the developing roller 30 and the agitator 20. The supply roller is rotatable about a rotational axis extending in the first direction.

When the developing cartridge 3 receives a driving force, developing agent is supplied from the accommodation chamber 13 inside the casing 10 onto an outer circumferential surface of the developing roller 30 (i.e., an outer circumferential surface of the developing roller body 31) through the supply roller. At this time, the developing agent is triboelectric charged between the supply roller and the developing roller 30. In the meantime, a bias voltage is applied to the developing roller shaft 32. As a consequence, the developing agent is attracted to the outer circumferential surface of the developing roller body 31 by an electrostatic force generated between the developing roller shaft 32 and the developing agent.

The developing cartridge 3 further includes a layer thickness-regulating blade (not illustrated). The layer thickness-regulating blade is configured to form the developing agent supplied onto the outer circumferential surface of the developing roller body 31 to a layer of constant thickness.

Subsequently, the developing agent on the outer circumferential surface of the developing roller body 31 is supplied onto the corresponding photosensitive drum 80 of the drum cartridge 4. At this time, the developing agent moves from the developing roller body 31 to the photosensitive drum 80 in accordance with an electrostatic latent image formed on the outer circumferential surface of the photosensitive drum 80, thereby developing the electrostatic latent image into a visible image on the outer circumferential surface of the photosensitive drum 80.

The gear portion 40 is positioned at the first end surface 11 of the casing 10. As illustrated in FIG. 3, the gear portion 40 includes a coupling 41, the developing roller gear 42, an idle gear 43, the agitator gear 44, and a gear cover 45. Note that, although each of the gears constituting the gear portion 40 includes a plurality of gear teeth, illustration of these plurality of gear teeth are omitted in FIG. 3.

The coupling 41 is a gear that first receives a driving force supplied from the main frame 2 of the image forming apparatus 1. The coupling 41 is rotatable about a rotational axis extending in the first direction. The coupling 41 includes a coupling part 411, and a coupling gear 412. The coupling part 411 and the coupling gear 412 is integrally formed of resin, for example. The coupling part 411 has a coupling hole 413 recessed in the first direction. The coupling gear 412 has a plurality of gear teeth at an outer periphery thereof.

When the drum cartridge 4 with the developing cartridges 3 being attached is attached to the main frame 2, one of drive shafts (not illustrated) in the image forming apparatus 1 is inserted into the coupling hole 413 of the coupling part 411 of a corresponding one of the developing cartridges 3. As a result, the drive shaft and the corresponding coupling part 411 are coupled to each other so as not to be rotatable relative to each other. Hence, when the drive shaft rotates, the coupling part 411 rotates and the coupling gear 412 rotates together with the coupling part 411.

The developing roller gear 42 functions to rotate the developing roller 30. The developing roller gear 42 is rotatable about a rotational axis extending in the first direction. The developing roller gear 42 has a plurality of gear teeth at an outer periphery thereof. At least one of the gear teeth of the coupling gear 412 is in meshing engagement with at least one of the gear teeth of the developing roller gear 42. Further, the developing roller gear 42 is coupled to the one end in the first direction of the developing roller shaft 32 as described above. With this configuration, rotation of the coupling gear 412 causes to the developing roller gear 42 to rotate and the developing roller 30 to rotate together with the developing roller gear 42.

The idle gear 43 is a gear that transmits the rotation of the coupling gear 412 to the agitator gear 44. The idle gear 43 is rotatable about a rotational axis extending in the first direction. The idle gear 43 includes a large diameter gear part 431 and a small diameter gear part 432 those arranged in the first direction. The small diameter gear part 432 is positioned between the large diameter gear part 431 and the first end surface 11 of the casing 10. In other words, the large diameter gear part 431 is positioned farther from the first end surface 11 than the small diameter gear part 432 is from the first end surface 11 in the first direction.

The small diameter gear part 432 has an addendum circle whose diameter is smaller than a diameter of an addendum circle of the large diameter gear part 431. The large diameter gear part 431 and the small diameter gear part 432 are integrally formed of resin, for example.

Each of the large diameter gear part 431 and the small diameter gear part 432 has a plurality of gear teeth at an outer periphery thereof. The number of the gear teeth of the small diameter gear part 432 is smaller than the number of gear teeth of the large diameter gear part 431. At least one of the plurality of gear teeth of the coupling gear 412 is in meshing engagement with at least one of the plurality of gear teeth of the large diameter gear part 431. Further, at least one of the plurality of gear teeth of the small diameter gear part 432 is in meshing engagement with at least one of the plurality of gear teeth of the agitator gear 44.

As the coupling gear 412 rotates, the large diameter gear part 431 also rotate to cause the small diameter gear part 432 to rotate together with the large diameter gear part 431, whereby the agitator gear 44 rotates in accordance with rotation of the small diameter gear part 432.

The agitator gear 44 is a gear for rotating the agitator 20. The agitator gear 44 is rotatable about a rotational axis extending in the first direction. The agitator gear 44 has a plurality of gear teeth at an outer periphery thereof. As described above, at least one gear tooth of the plurality of gear teeth of the small diameter gear part 432 is in meshing engagement with at least one gear tooth of the plurality of gear teeth of the agitator gear 44. Further, the agitator gear 44 is coupled to the one end in the first direction of the agitator shaft 21. With this configuration, when a driving force is transmitted to the agitator gear 44 through the coupling 41 and the idle gear 43, the agitator gear 44 rotates to cause the agitator 20 to rotate together with the agitator gear 44.

The gear cover 45 is fixed to the first end surface 11 of the casing 10. The coupling gear 412, the developing roller gear 42, the idle gear 43, and the agitator gear 44 are accommodated in a space defined between the first end surface 11 and the gear cover 45. The coupling hole 413 of the coupling part 411 is exposed to an outside of the gear cover 45. The gear cover 45 includes a first columnar protrusion 46 extending in the first direction. The gear cover 45 in the present embodiment also functions as a holder cover for holding a holder 52 of the IC chip assembly 50 (described later). A configuration of the gear cover 45 as the holder cover will be described later.

Figure 4:
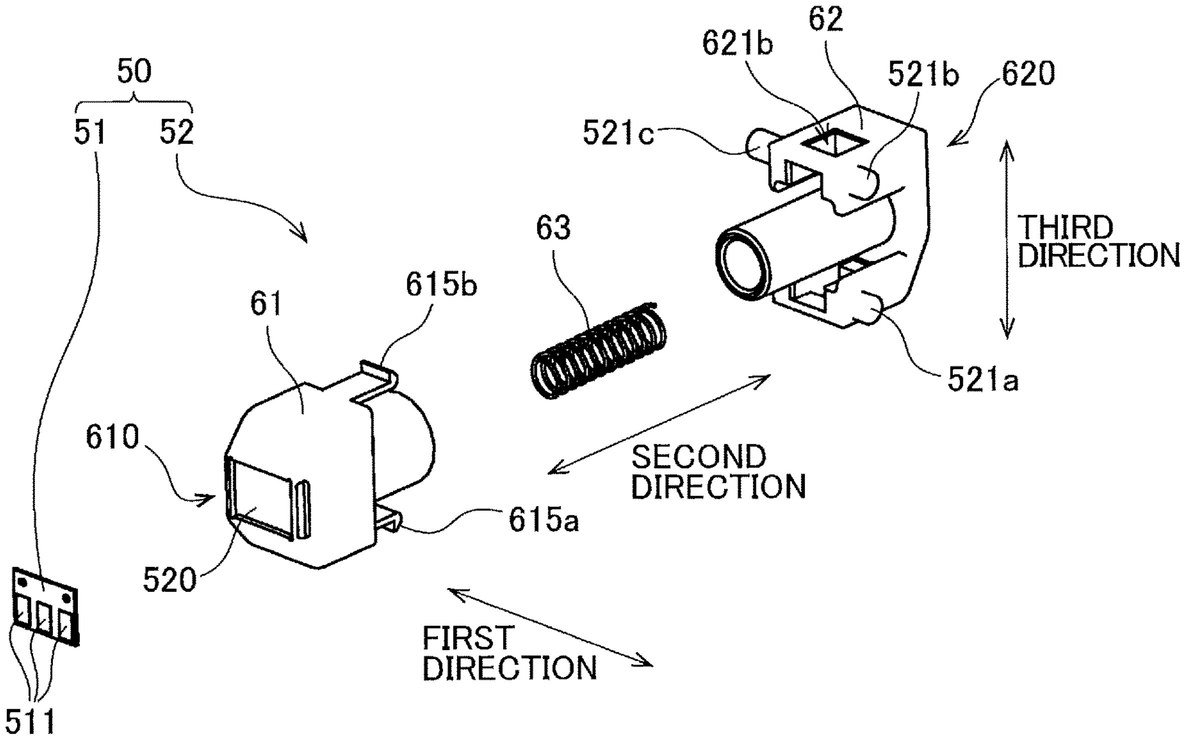
FIG. 4 is an exploded perspective view of an IC chip assembly of the developing cartridge in the image forming apparatus according to the embodiment.
Figure 5:
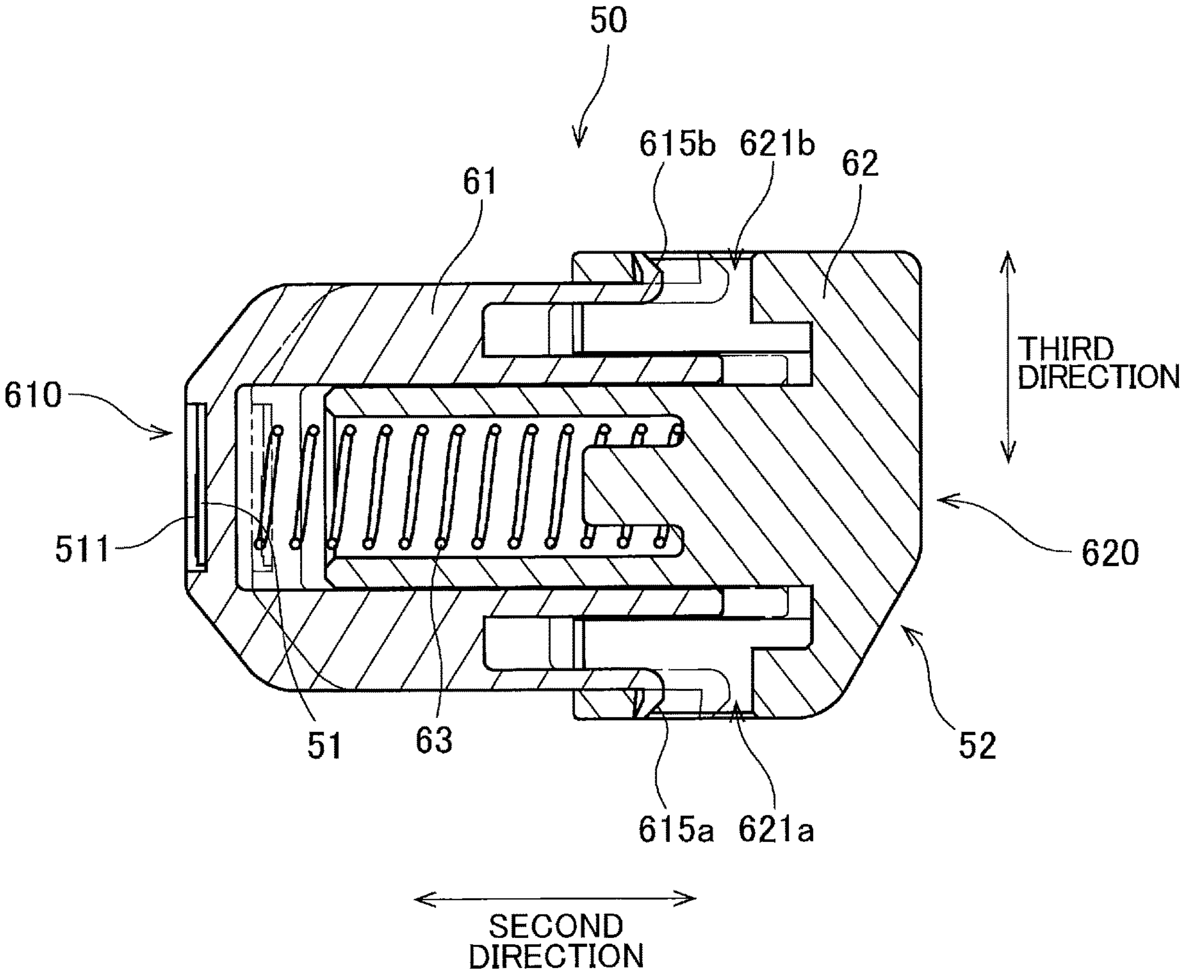
FIG. 5 is a cross-sectional view of the IC chip assembly of the developing cartridge in the image forming apparatus according to the embodiment.

The IC chip assembly 50 is positioned outside of the first end surface 11 of the casing 10. FIG. 4 is an exploded perspective view of the IC chip assembly 50. FIG. 5 is a cross-sectional view of the IC chip assembly 50 taken along a plane perpendicular to the first direction. As illustrated in FIGS. 3 through 5, the IC chip assembly 50 includes the IC chip 51 serving as a storage medium, and the holder 52 holding the IC chip 51. The IC chip 51 is fixed to an outer surface of the holder 52. The holder 52 is held at a position between the casing 10 and the gear cover 45. The IC chip 51 has the electrical contact surface 511. The electrical contact surface 511 is made from electrically conductive material such as metal.

The IC chip 51 can store therein various information relating to the developing cartridge 3. Specifically, the IC chip 51 can store therein at least one of: the accumulated number of printed sheets using the developing roller 30; the accumulated number of rotations of the developing roller 30; and an accumulated consumption quantity of developing agent. Such information indicates remaining lifetime of the developing cartridge 3. Note that the IC chip 51 may also store therein information relating to specification of the developing cartridge 3.

A part of the holder 52 is covered with the gear cover 45. The holder 52 includes a first boss 521*a*, a second boss 521*b*, and a third boss 521*c*. Each of the first boss 521*a* and the second boss 521*b* protrudes toward the gear cover 45 in the first direction from a surface of the holder 52 that faces the gear cover 45. Further, the first boss 521*a* and the second boss 521*b* are arranged in the third direction.

On the other hand, the gear cover 45 has a first through-hole 451*a* and a second through-hole 451*b*. Each of the first through-hole 451*a* and the second through-hole 451*b* penetrates the gear cover 45 in the first direction. Further, the first through-hole 451*a* and the second through-hole 451*b* are arranged in the third direction. The first boss 521*a* and the second boss 521*b* are inserted through the first through-hole 451*a* and the second through-hole 451*b*, respectively.

The third boss 521*c* protrudes toward the casing 10 in the first direction from a surface of the holder 52 that faces the casing 10. In the meantime, the casing 10 has a recessed portion 15. The recessed portion 15 is recessed in the first direction from the first end surface 11 of the casing 10. The third boss 521*c* is inserted into the recessed portion 15. Incidentally, each of the first boss 521*a*, the second boss 521*b*, and the third boss 521*c* may have a circular columnar shape or prismatic columnar shape.

The first through-hole 451*a* has a dimension (an inner dimension) in the second direction greater than a dimension (an outer dimension) in the second direction of the first boss 521*a*. The second through-hole 451*b* has a dimension (an inner dimension) in the second direction greater than a dimension (an outer dimension) in the second direction of the second boss 521*b*. Further, the recessed portion 15 has a dimension (an inner dimension) in the second direction greater than a dimension (an outer dimension) in the second direction of the third boss 521*c*.

With the above dimensional relationship, the holder 52 is movable together with the first boss 521*a*, the second boss 521*b*, and the third boss 521*c* in the second direction relative to the casing 10 and the gear cover 45. The IC chip 51 having the electrical contact surface 511 also moves in the second direction together with the movement of the holder 52 in the second direction.

Further, the first through-hole 451*a* has a dimension (an inner dimension) in the third direction greater than a dimension (an outer dimension) in the third direction of the first boss 521*a*. The second through-hole 451*b* has a dimension (an inner dimension) in the third direction greater than a dimension (an outer dimension) in the third direction of the second boss 521*b*. Further, the recessed portion 15 has a dimension (an inner dimension) in the third direction greater than a dimension (an outer dimension) in the third direction of the third boss 521*c*.

Hence, the holder 52 is movable together with the first boss 521*a*, the second boss 521*b*, and the third boss 521*c* in the third direction relative to the casing 10 and the gear cover 45. The IC chip 51 having the electrical contact surface 511 also moves in the third direction when the holder 52 moves in the third direction.

Incidentally, the holder 52 may be movable in the first direction within the space between the first end surface 11 of the casing 10 and the gear cover 45. Further, the number of bosses provided on the holder 52, the number of through-holes formed in the gear cover 45, and the number of recessed portions formed in the casing 10 need not be limited to the numbers described in the present embodiment. Further, recessed portions may be formed in the gear cover 45 instead of the through-holes to allow the bosses to be inserted in the recessed portions.

As illustrated in FIGS. 4 and 5, the holder 52 has a first outer surface 610 and a second outer surface 620. The first outer surface 610 is positioned at one end in the second direction of the holder 52, whereas the second outer surface 620 is positioned at another end in the second direction of the holder 52. The second outer surface 620 is movable in the second direction relative to the first outer surface 610.

Specifically, the holder 52 in the present embodiment includes a first holder member 61, a second holder member 62, and a coil spring 63 positioned between the first holder member 61 and the second holder member 62. Each of the first holder member 61 and the second holder member 62 is made from resin, for example. The first holder member 61 has the first outer surface 610. The first outer surface 610 has a holding surface 520 to which the IC chip 51 is fixed. The second holder member 62 has the second outer surface 620. In an assembled state of the holder 52, the first outer surface 610 and the second outer surface 620 are in separation from each other in the second direction.

The coil spring 63 is an elastic member extending in the second direction. The coil spring 63 is positioned between the first outer surface 610 and the second outer surface 620 in the second direction. The coil spring 63 is capable of expanding and contracting in the second direction at least between: a first state; and a second state in which the coil spring 63 is more compressed than in the first state.

A length in the second direction of the coil spring 63 in the first state is greater than the length in the second direction of the coil spring 63 in the second state. Therefore, a distance in the second direction between the first outer surface 610 and the second outer surface 620 in the first state of the coil spring 63 is greater than the distance in the second direction between the first outer surface 610 and the second outer surface 620 in the second state of the coil spring 63. Further, the length in the second direction of the coil spring 63 in at least the second state is smaller than a natural length of the coil spring 63.

Further, as illustrated in FIGS. 4 and 5, the first holder member 61 includes a first pawl 615*a* and a second pawl 615*b*. Each of the first pawl 615*a* and the second pawl 615*b* protrudes from the first holder member 61 in a direction crossing the second direction. In the meantime, the second holder member 62 has a first opening 621*a* and a second opening 621*b*. The first pawl 615*a* is inserted through the first opening 621*a*, and the second pawl 615*b* is inserted through the second opening 621*b*.

As indicated by the solid line in FIG. 5, when the coil spring 63 is in the first state, the first pawl 615*a* contacts an edge of the first opening 621*a* closer to the first outer surface 610, and the second pawl 615*b* contacts an edge of the second opening 621*b* closer to the first outer surface 610. This configuration prevents further expansion of the coil spring 63 in the second direction from the length in the first state, and prevents unintentional detachment of the first holder member 61 from the second holder member 62.

On the other hand, when the coil spring 63 is in the second state, the first pawl 615*a* and the second pawl 615*b* are separated from the second holder member 62 as indicated by a broken line in FIG. 5.

Incidentally, instead of the first and second openings 621*a* and 621*b*, the second holder member 62 may have recessed portions or stepped portions with which the pawls can contact. Alternatively, the first holder member 61 may have openings, recessed portions or stepped portions, and the second holder member 62 may have pawls.

By virtue of a difference in dimension between the first through-hole 451*a* and the first boss 521*a*, a difference in dimension between the second through-hole 451*b* and the second boss 521*b*, a difference in dimension between the recessed portion 15 and the third boss 521*c*, and the expansion and contraction of the coil spring 63, the holding surface 520 of the holder 52 is movable in the second direction relative to the casing 10.

<3. Drum Cartridge>

Figure 6:
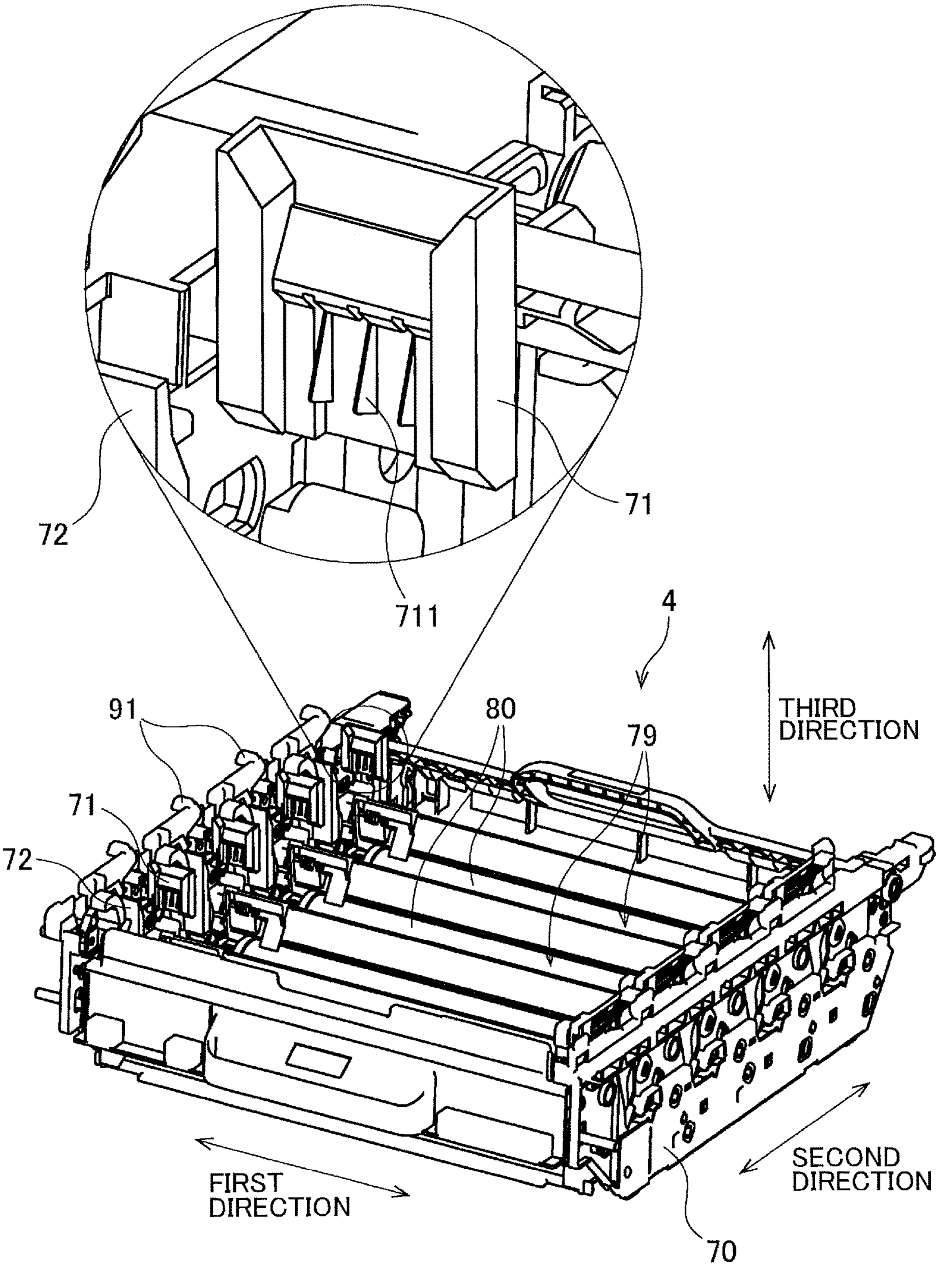
FIG. 6 is a perspective view of the drum cartridge in the image forming apparatus according to the embodiment.

FIG. 6 is a perspective view of the drum cartridge 4. As illustrated in FIG. 6, the drum cartridge 4 includes a drum frame 70 and the four photosensitive drums 80. The drum frame 70 has four slots 79. Each of the developing cartridges 3 is attachable to a corresponding one of slots 79. Each of the photosensitive drums 80 is positioned at one end portion in the third direction of the corresponding one of slots 79. Each of the photosensitive drum 80 is rotatable about a rotational axis extending in the first direction. The outer circumferential surface of each of the photosensitive drums 80 is coated with photosensitive material.

Figure 7:
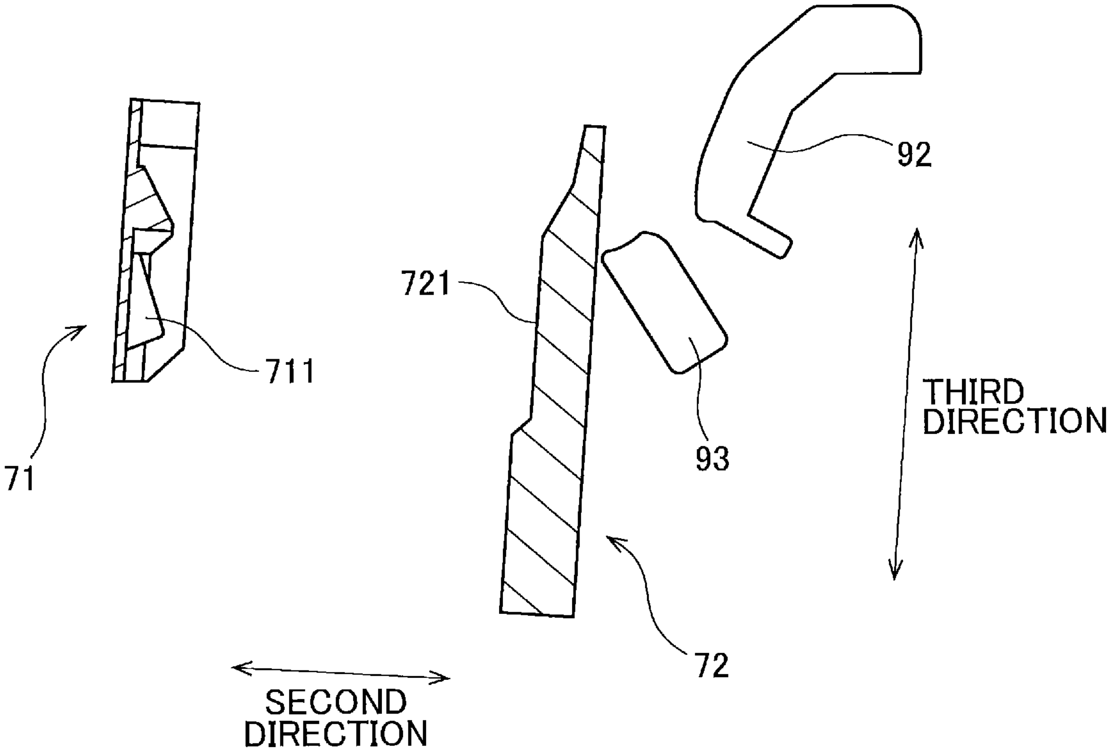
FIG. 7 is a cross-sectional view of one of first guide plates and one of second guide plates and a portion in the vicinity thereof of the drum cartridge in the image forming apparatus according to the embodiment.

The drum frame 70 includes a first guide plate 71 and a second guide plate 72 for each of the four slots 79. The first guide plate 71 and the second guide plate 72 are positioned at one end in the first direction of the corresponding slot 79. FIG. 7 is a cross-sectional view of the first guide plate 71 and the second guide plate 72 taken along a plane perpendicular to the first direction. As illustrated in FIGS. 6 and 7, the first guide plate 71 and the second guide plate 72 are positioned to be spaced apart from each other in the second direction. Each of the first guide plate 71 and the second guide plate 72 expands in the first direction and the third direction.

The first guide plate 71 includes the electrical connector 711. The electrical connector 711 is an electric contact contactable with the electrical contact surface 511 of the IC chip 51. The electrical connector 711 is made of electrically conductive material such as metal. The electrical connector 711 protrudes from a surface of the first guide plate 71 in the second direction toward the second guide plate 72. When the drum cartridge 4 is attached to the main frame 2, the electrical connector 711 is electrically connected to the controller 5.

On the other hand, the second guide plate 72 has a support surface 721. The electrical connector 711 and the support surface 721 face each other in the second direction. In the state where the developing cartridge 3 is attached to the drum cartridge 4, the holder 52 is nipped between the electrical connector 711 and the support surface 721. In this state, the electrical contact surface 511 of the IC chip 51 is in contact with the electrical connector 711, and the second outer surface 620 of the holder 52 is in contact with the support surface 721. Further, in this state, the coil spring 63 is in the second state.

As illustrated in FIG. 6, the drum cartridge 4 includes a plurality of separation levers 91. One separation lever 91 is positioned at each of one end portion and another end portion in the first direction for each of the four slots 79. As illustrated in FIG. 7, the drum cartridge 4 further includes a plurality of pressure members 92 and a plurality of counter-pressing members 93. One pressure member 92 and one counter-pressing member 93 is positioned at each of the one end portion and the other end portion in the first direction for each of the slots 79. The counter-pressing member 93 is movable in interlocking relation to the corresponding separation lever 91.

The first columnar protrusion 46 (see FIG. 3) of developing cartridge 3 is interposed between the pressure member 92 and the counter-pressing member 93 as a result of attachment of the developing cartridge 3 to the drum cartridge 4. The developing cartridge 3 also includes a second columnar protrusion (not illustrated) similar to the first columnar protrusion 46 that extends in the first direction from the second end surface 12 of the casing 10. The second columnar protrusion is positioned between the corresponding pressure member 92 and counter-pressing member 93 when the developing cartridge 3 is attached to the drum cartridge 4.

The pressure members 92 urge the first columnar protrusion 46 and the second columnar protrusion toward the photosensitive drum 80. Hence, the outer circumferential surface of the developing roller 30 is brought into contact with the outer circumferential surface of the corresponding photosensitive drum 80.

<4. Separation Process>

Figure 8:
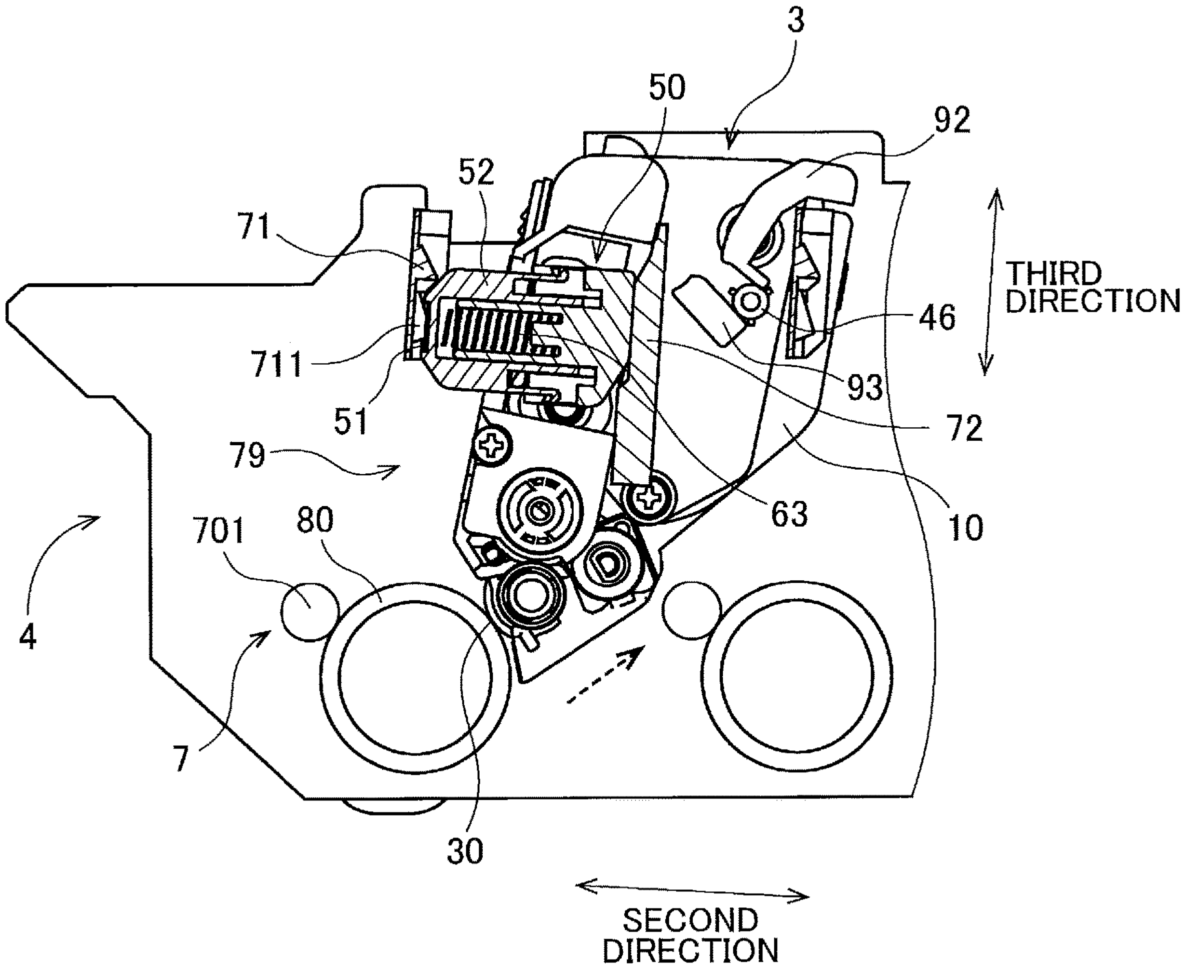
FIG. 8 is an explanatory view illustrating the developing cartridge and the drum cartridge during a separation process performed in the image forming apparatus according to the embodiment.

The image forming apparatus 1 according to the embodiment can perform a separation process in the state where the drum cartridge 4 to which the developing cartridges 3 are attached is attached to the main frame 2. The separation process is performed for the purpose of separating the developing rollers 30 away from the corresponding photosensitive drums 80. FIG. 8 illustrates a state where the separation process is performed in the image forming apparatus 1.

For performing the separation process, driver levers (not illustrated) provided in the main frame 2 press the corresponding separation levers 91 in response to instructions outputted from the controller 5, whereupon the counter-pressing members 93 move toward the corresponding pressure members 92. Accordingly, the first columnar protrusion 46 and the second columnar protrusion are pressed by the corresponding counter-pressing members 93 to be moved against a pressing force applied from the corresponding pressure members 92.

As a result, the casing 10 of the developing cartridge 3 is moved relative to the main frame 2 and the drum cartridge 4 together with the developing roller 30 in a direction in which the developing roller 30 separates from the photosensitive drum 80 as indicated by a broken line arrow in FIG. 8. That is, a state of the developing roller 30 and the photosensitive drum 80 is changed from a contact state where the developing roller 30 is in contact with the photosensitive drum 80 to a separation state where the developing roller 30 is in separation from the photosensitive drum 80.

In the following description, the direction in which the casing 10 and the developing roller 30 move relative to the photosensitive drum 80 during the separation process will be referred to as "separating direction". The separating direction contains components of the second direction and the third direction.

The holder 52 is movable relative to the casing 10 in the separating direction. Therefore, the IC chip assembly 50 is nipped and held between the electrical connector 711 and the support surface 721 not only in the contacting state but also in the separating state. Accordingly, the electrical contact surface 511 of the IC chip 51 maintains contact with the electrical connector 711 in both the contact state and the separation state.

The holder 52 is out of contact with both the casing 10 and the gear cover 45. Further, the first guide plate 71 and the second guide plate 72 are out of contact with both the casing 10 and the gear cover 45. Therefore, when the separation process is performed, the casing 10 is movable relative to the holder 52 while the holder 52 is held between the first guide plate 71 and the second guide plate 72.

That is, during the separation process, the position of the IC chip assembly 50 relative to the drum cartridge 4 is maintained unchanged in spite of movement of the casing 10 and the developing roller 30 in the separating direction. Further, the state of the coil spring 63 is maintained unchanged from the second state. That is, the casing 10 and the developing roller 30 move in the separating direction the electrical contact surface 511 is fixed in position relative to the drum cartridge 4. Thus, a contact state where the electrical contact surface 511 and the electrical connector 711 is in contact with each other can be maintained. Further, frictional wearing of the electrical contact surface 511 during the separation process can be restrained.

<5. Process Performed by Controller>

Next, processes performed by the controller 5 in the image forming apparatus 1 according to the embodiment will be described.

<5-1. Initial Process>

Figure 9:
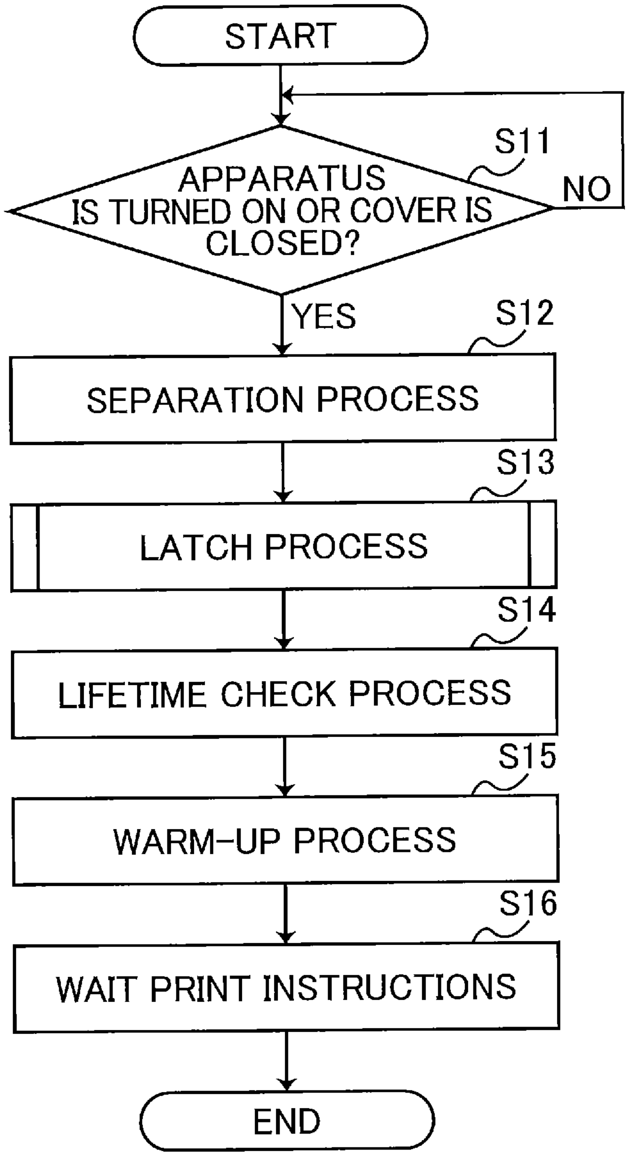
FIG. 9 is a flowchart illustrating an initial process performed by a controller in the image forming apparatus according to the embodiment.

First, an initial process will be described. The controller 5 executes the initial process when the image forming apparatus 1 is turned on or the cover 202 of the image forming apparatus 1 moves to the closed position. FIG. 9 is a flowchart illustrating a routine of the initial process. At the time of start of the initial process, the drum cartridge 4 to which the four developing cartridges 3 are attached is supposed to be attached to the main frame 2 of the image forming apparatus 1.

First, in S11 the controller 5 determines whether the image forming apparatus 1 is turned on or determines whether the cover 202 of the image forming apparatus 1 moves to the closed position (S11, a detecting process). For example, the controller 5 determines that the image forming apparatus 1 is turned on when supply of current to the controller 5 is started. The controller 5 determines that the cover 202 of the image forming apparatus 1 moves to the closed position when the controller 5 receives detection signal from the cover sensor 203.

When the controller 5 determines that the image forming apparatus 1 is turned on or the cover 202 moves to the closed position (S11: YES), in S12 the controller 5 subsequently executes the separation process. Specifically, the controller 5 drives the driver lever (not illustrated) to press the separation lever 91 of the drum cartridge 4 to move the counter-pressing member 93 in the separating direction. As a result, the casing 10 and the developing roller 30 move relative to the main frame 2 and the drum cartridge 4 in the separating direction, thereby moving the developing roller 30 away from the photosensitive drum 80 in the separating direction.

In response to performing the separation process in S12 as a trigger, in S13 the controller 5 executes a latch process in which the controller 5 reads information from the IC chip 51. That is, the controller 5 executes the latch process while continuing executing the separation process in S12.

Figure 10:
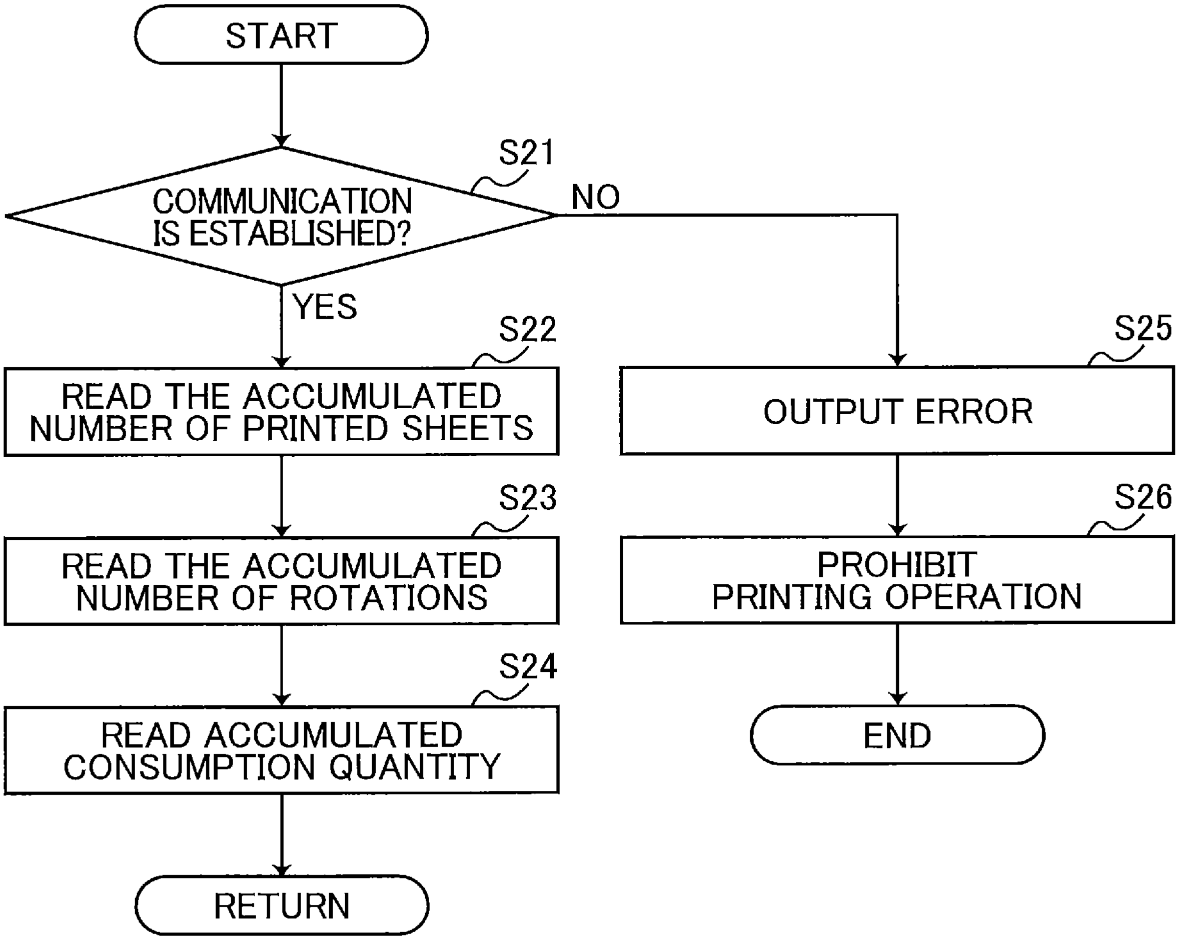
FIG. 10 is a flowchart illustrating a latch process performed by the controller in the image forming apparatus according to the embodiment.

FIG. 10 is a flowchart illustrating a detailed routine of the latch process. As illustrated in FIG. 10, in S21 the controller 5 determines whether the controller 5 can communicate with the IC chip 51 (a communication check process). Specifically, the controller 5 determines whether the controller 5 can read at least one of the accumulated number of printed sheets, the accumulated number of rotations of the developing roller 30, and the accumulated consumption quantity of developing agent from the IC chip 51.

As described above, the electrical contact surface 511 of the IC chip 51 maintains contact with the electrical connector 711 when the separation process is normally executed. Accordingly, the controller 5 can communicate with the IC chip 51. On the other hand, the controller 5 cannot communicate with the IC chip 51 when electrical connection between the electrical contact surface 511 and the electrical connector 711 is not normal.

When the controller 5 determines that communication with the IC chip 51 is established (S21: YES), the controller 5 reads from the IC chip 51 in S22 the accumulated number of printed sheets, in S23 the accumulated number of rotations of the developing roller 30, and in S24 the accumulated consumption quantity of developing agent. The controller 5 subsequently writes into the main memory 502 the accumulated number of printed sheets, the accumulated number of rotations, and the accumulated consumption quantity of developing agent those read from the IC chip 51 in the process of S22 through S24. Then, the controller 5 ends the latch process and returns to S14 in FIG. 9.

On the other hand, when the controller 5 determines that the communication with the IC chip 51 is not established (S21: NO), in S25 the controller 5 outputs an error (an error output process). Specifically, the controller 5 controls the display 6 to display thereon an error massage.

In this case, there is a likelihood that the electrical connection between the electrical contact surface 511 of the IC chip 51 and the electrical connector 711 is not normally established. This may be caused by a situation in which relative movement of the holder 52 to the casing 10 in the separating direction is not performed, or the mechanism for performing the separation process does not normally operate. Accordingly, in S26 the controller 5 prohibits execution of a printing operation. That is, the controller 5 ends the initial process without executing the process subsequent to S14 in FIG. 9.

Referring back to FIG. 9, after executing the process in S24, in S14 the controller 5 checks remaining lifetime of the developing cartridge 3 (a lifetime check process). Specifically, the controller 5 calculates the remaining lifetime of the developing cartridge 3 based on the accumulated number of printed sheets, the accumulated number of rotations, and the accumulated consumption quantity of developing agent those read in the process of S22 through S24. Then, when the calculated remaining lifetime is shorter than a preset threshold value, the controller 5 controls the display 6 to display thereon a massage indicating that a service life of the developing cartridge 3 is approaching.

Then, in S15 the controller 5 executes a warm-up process. The warm-up process includes a process for rotating the photosensitive drum 80. At this time, the separation process is still executed. Therefore, the developing roller 30 is in separation from the photosensitive drum 80. Accordingly, frictional contact between the outer circumferential surface of the photosensitive drum 80 and the outer circumferential surface the developing roller 30 during rotation of the photosensitive drum 80 in the warm-up process does not occur.

After completing the warm-up process in S15, in S16 the controller 5 waits an input of print instructions and ends the initial process.

<5-2. Printing Process>

Figure 11:
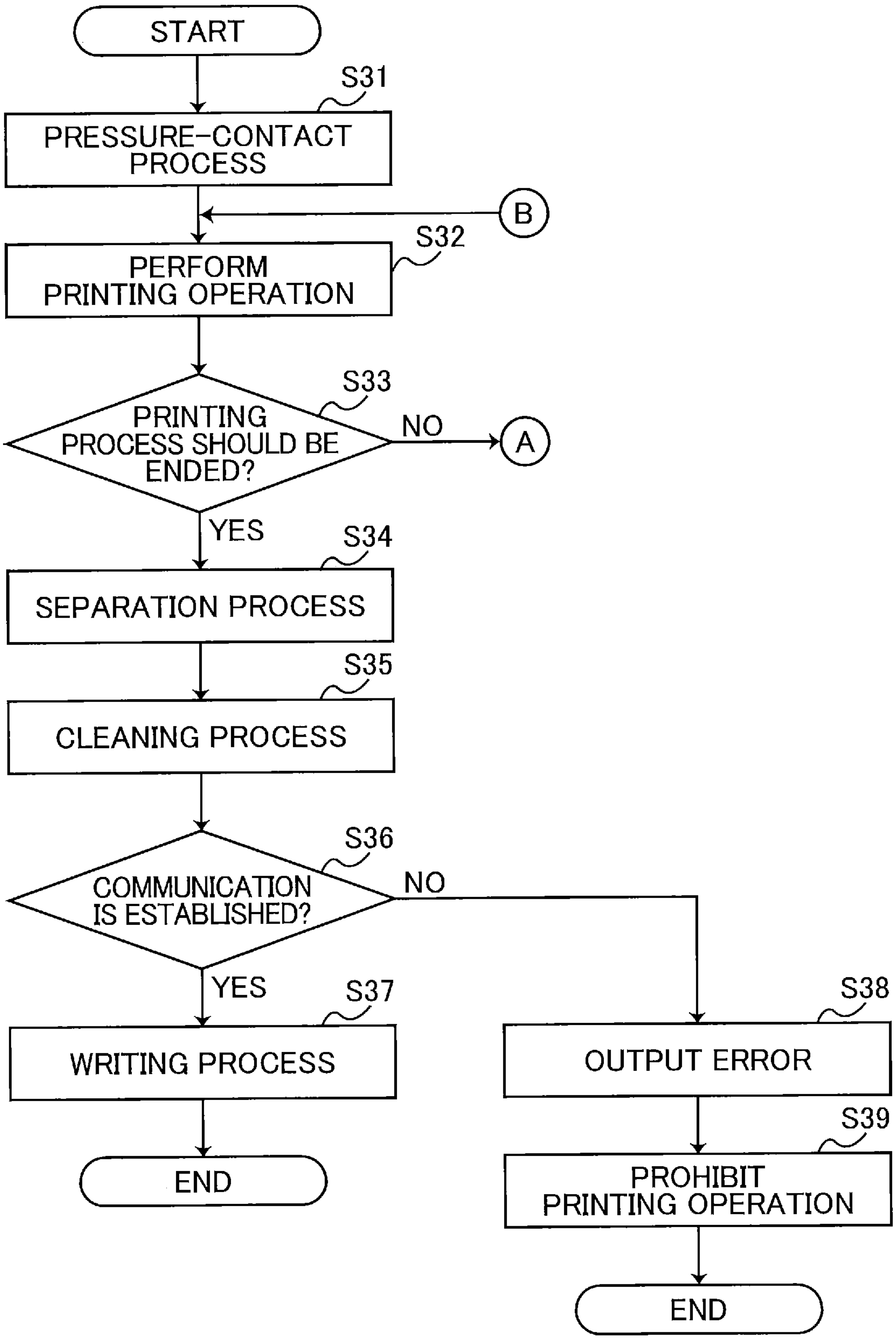
FIG. 11 is a flowchart illustrating a first part of a printing process performed by the controller in the image forming apparatus according to the embodiment.
Figure 12:
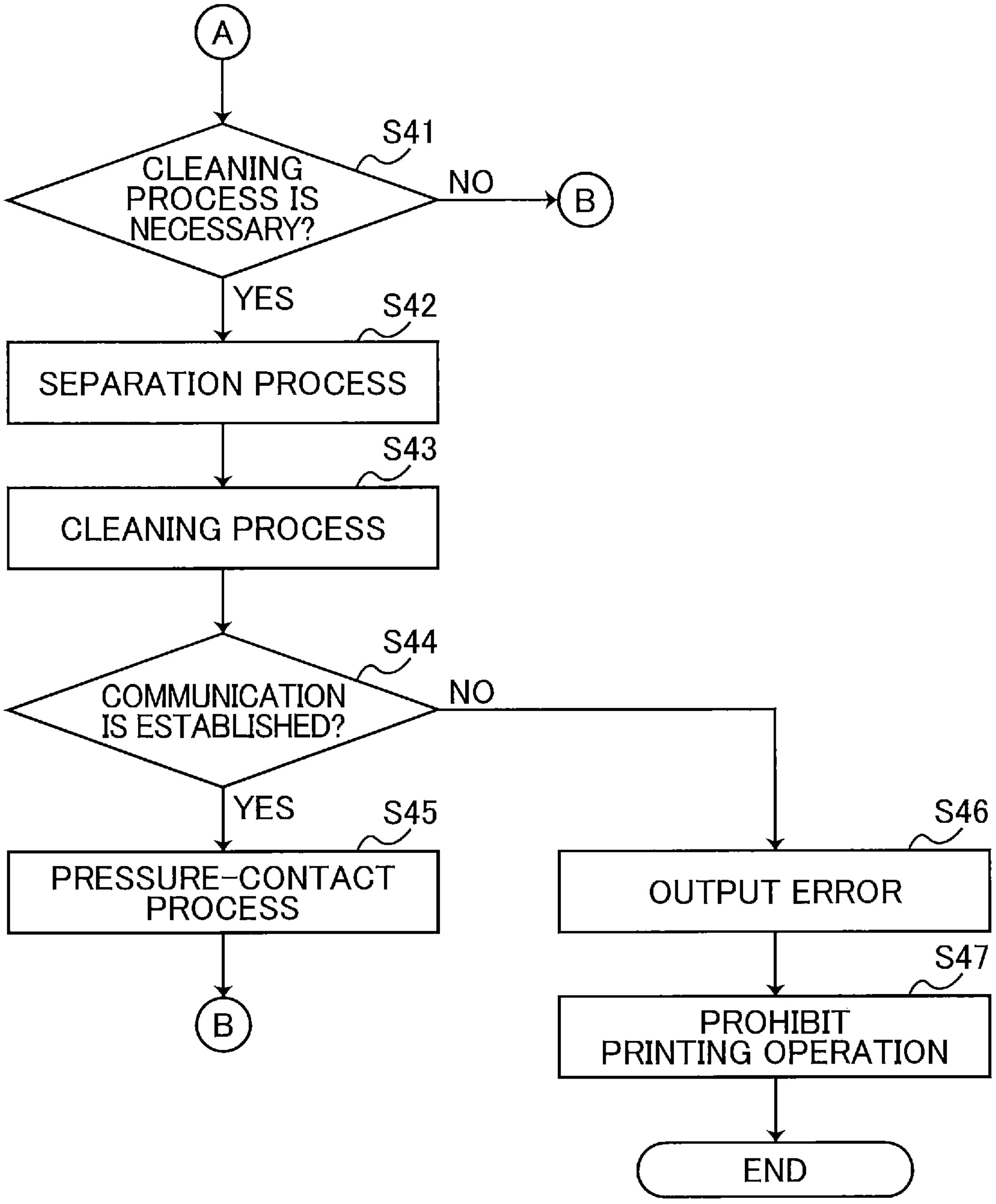
FIG. 12 is a flowchart illustrating a second part the printing process performed by the controller in the image forming apparatus according to the embodiment.

Next, a printing process will be described. FIGS. 11 and 12 illustrate flowcharts illustrating a routine of the printing process.

In response to input of print instructions into the controller 5, in S31 the controller 5 executes a pressure-contact process. First, the controller 5 ends the separation process. Specifically, the controller 5 stops the driver lever to be driven to release pressure to the separation lever 91, thereby causing the casing 10 and the developing roller 30 to move relative to the main frame 2 and the drum cartridge 4 in a direction opposite the separating direction. As a result, the outer circumferential surface of the developing roller 30 is brought into contact with the outer circumferential surface of the photosensitive drum 80 by application of pressure from the pressure member 92.

Then, in S32 the controller 5 executes one printing operation based on the one inputted print instructions. Specifically, the controller 5 controls the developing roller 30 and the photosensitive drum 80 to rotate to form an image on a printing sheet using the developing agent supplied from the developing cartridge 3, i.e. supplied through the developing roller 30 and the photosensitive drum 80.

Further, the controller 5 updates the accumulated number of printed sheets, the accumulated number of rotations of the developing roller 30, and the accumulated consumption quantity of developing agent those stored in the main memory 502. Specifically, the controller 5 increments each of the accumulated number of printed sheets, the accumulated number of rotations of the developing roller 30, and the accumulated consumption quantity of developing agent those stored in the main memory 502.

After completing the printing operation based on the one print instructions in S32, in S33 the controller 5 determines whether the next print instructions exist. When the controller 5 determines that the next print instructions do not exist and the printing process should be ended (S33: YES), the controller 5 executes the separation process in S34. Specifically, the controller 5 controls the separation lever 91 of the drum cartridge 4 to move so that the counter-pressing member 93 moves in the separating direction. Hence, the casing 10 and the developing roller 30 move relative to the main frame 2 and the drum cartridge 4 in the separating direction, whereupon the developing roller 30 move away from the photosensitive drum 80 in the separating direction.

Then, in response to performing the separation process of S34 as a trigger, in S35 the controller 5 executes the cleaning process for cleaning the photosensitive drum 80. That is, the controller 5 executes the cleaning process while continuing the separation process in S34. Specifically, the controller 5 controls the cleaning unit 7 to perform a cleaning operation to clean the photosensitive drum 80. Hence, unnecessary developing agent adhered onto the outer circumferential surface of the photosensitive drum 80 is removed.

Further, in response to performing the separation process of S34 as a trigger, in S36 the controller 5 determines whether communication with the IC chip 51 is established (the communication check process). That is, the controller 5 also executes the communication check process while continuing the separation process in S34. Specifically, the controller 5 determines whether the controller 5 can write into the IC chip 51 at least one of the accumulated number of printed sheets, the accumulated number of rotations of the developing roller 30, and the accumulated consumption quantity of developing agent.

When the controller 5 determines that communication with the IC chip 51 is established (S36: YES), in S37 the controller 5 writes the accumulated number of printed sheets, the accumulated number of rotations of the developing roller 30, and the accumulated consumption quantity of developing agent those stored in the main memory 502 into the IC chip 51 (a writing process). Then, the controller 5 again waits for input of print instructions and ends the printing process.

On the other hand, when the controller 5 determines that the communication with the IC chip 51 is not established (S36: NO), in S38 the controller 5 outputs an error (the error output process). Specifically, the controller 5 controls the display 6 to display thereon an error message.

In this case, there is a likelihood that the electrical connection between the electrical contact surface 511 of the IC chip 51 and the electrical connector 711 is not normally established. This may be caused by a situation in which relative movement of the holder 52 to the casing 10 in the separating direction is not performed, or the mechanism for performing the separation process does not normally operate. Accordingly, in S39 the controller 5 prohibits execution of a printing operation subsequent to the printing operation performed in the process of S32, and ends the printing process.

Further, when the controller 5 determines in S33 that the next printing operation exists and the printing process should not be ended (S33: NO), the controller 5 executes the process illustrated in FIG. 12. In this case, the controller 5 determines in S41 whether the cleaning process for the photosensitive drum 80 needs to be performed. Specifically, the controller 5 determines whether printing operations for the prescribed number of sheets was performed since the controller 5 executed the last cleaning process.

When printing operations for the prescribed number of sheets was not executed since the last cleaning process, the controller 5 determines that the cleaning process need not be performed (S41: NO). In this case, the controller 5 returns to the process in S32 for performing the next printing operation based on the next print instructions.

On the other hand, when printing operations for the prescribed number of sheets was performed after the last cleaning process, the controller 5 determines that the cleaning process is necessary (S41: YES). In this case, in S42 the controller 5 performs the separation process. Specifically, the controller 5 controls the separation lever 91 of the drum cartridge 4 to move to cause movement of the counter-pressing member 93 in the separating direction. Hence, the casing 10 and the developing roller 30 are moved relative to the main frame 2 and the drum cartridge 4 in the separating direction. As a result, the developing roller 30 moves away from the photosensitive drum 80 in the separating direction and is in separation from the photosensitive drum 80.

Then, in response to performing the separation process of S42 as a trigger, in S43 the controller 5 executes the cleaning process to clean the photosensitive drum 80. That is, the controller 5 executes the cleaning process while continuing the separation process in S42. Specifically, the controller 5 controls the cleaning unit 7 to operate to clean the photosensitive drum 80. Hence, unnecessary developing agent adhered onto the outer circumferential surface of the photosensitive drum 80 is removed.

Further, in response to performing the separation process of S42 as a trigger, in S44 the controller 5 determines whether the controller 5 can communicate with the IC chip 51 (the communication check process). That is, the controller 5 executes the communication check process in S44 while continuing the separation process in S42. Specifically, the controller 5 determines whether reading of information from the IC chip 51 or writing of information into the IC chip 51 can be performed.

When the controller 5 determines in S44 that the controller 5 can communicate with the IC chip 51 (S44: YES), in S45 the controller 5 executes the pressure-contacting process and ends the separation process. Specifically, the controller 5 controls the separation lever 91 to stop applying pressure to the counter-pressing member 93. Accordingly, the casing 10 and the developing roller 30 move relative to the main frame 2 and the drum cartridge 4 in the direction opposite the separating direction so that the outer circumferential of the developing roller 30 is brought into contact with the outer circumferential surface of the photosensitive drum 80 by the application of pressure from the pressure member 92.

Then, the controller 5 returns to the process in S32 to execute the next printing operation based on the next print instructions.

On the other hand, when the controller 5 determines in S44 that the controller 5 cannot communicate with the IC chip 51 cannot be made, in S46 the controller 5 outputs an error (the error output process). Specifically, the controller 5 controls the display 6 to display thereon an error message.

In this case, there is a likelihood that the electrical connection between the electrical contact surface 511 of the IC chip 51 and the electrical connector 711 is not normally established. This may be caused by a situation in which relative movement of the holder 52 to the casing 10 in the separating direction is not performed, or the mechanism for performing the separation process does not normally operate. Accordingly, in S47 the controller 5 prohibits execution of printing operations subsequent to the printing operation performed in the process of S32.

As described above, in the image forming apparatus 1 according to the present embodiment, the controller 5 determines whether communication with the IC chip is established upon start of execution of the separation process as a trigger, and outputs an error in the error output process in response to determination that the communication with the IC chip 51 is not established. That is, in a case where electrical connection between the electrical contact surface 511 and the electrical connector 711 is not normally established, an error is outputted.

Accordingly, based on the outputted error, a user of the image forming apparatus 1 can recognize that there is a possibility of electrical connection between the electrical contact surface 511 and the electrical connector 711 being not normal. Further, the user can recognize that there is a possibility that the relative movement of the holder 52 to the casing 10 cannot be performed or a possibility that the separation mechanism does not operate normally.

Further, according to the present embodiment, the controller 5 executes the separation process in response to detecting that the image forming apparatus 1 is turned on or that the cover 202 moves to the closed position, and determines whether the controller 5 can communicate with the IC chip 51 triggering start of the separation process. Through this operation, output of an error can be performed prior to performing a printing operation in a case where the electrical connection between the electrical contact surface 511 and the electrical connector 711 is not normal.

Further, according to the present embodiment, the controller 5 determines in the communication check process of S21 whether at least one of the accumulated number of printed sheets, the accumulated number of rotations of the developing roller 30, and the accumulated consumption quantity of developing agent can be read from the IC chip 51. With this process, whether the communication with the IC chip 51 is established can be determined by making use of process for reading information from the IC chip 51 in the latch process. Accordingly, the controller 5 does not need to execute the communication check process at a timing other than the latch process.

Further, according to the present embodiment, the controller 5 executes the separation process each time printing operations using the developing cartridge 3 is performed, and determines whether the communication with the IC chip 51 is established in response to start of the separation process as a trigger. Accordingly, output of an error can be performed in a case where electrical connection between the electrical contact surface 511 and the electrical connector 711 becomes not normal.

Further, according to the present embodiment, the controller 5 determines in the communication check process of S36 whether the controller 5 can write into the IC chip 51 at least one of the accumulated number of printed sheets, the accumulated number of rotations of the developing roller 30, and the accumulated consumption quantity of developing agent. With this operation, whether communication between the controller 5 and the IC chip 51 is established can be determined by making use of the process for writing information into the IC chip 51 performed after a printing operation. Accordingly, the communication check process at a timing other than the writing process after the printing operation is unnecessary.

Further, according to the present embodiment, the controller 5 executes the separation process when determining that the cleaning process for cleaning the photosensitive drum 80 is necessary, and determines whether the communication with the IC chip 51 is established upon start of the separation process as a trigger. Therefore, output of an error can be performed when the electrical connection between the electrical contact surface 511 and the electrical connector 711 is not normally established.

Further, according to the present embodiment, the controller 5 prohibits subsequent printing operations in response to the determination in the process of S21, S36, and S44 that the communication with the IC chip 51 is not established. With this operation, execution of printing operations while the electrical connection between the electrical contact surface 511 and the electrical connector 711 is not normal can be avoided.

<6. Modifications>

While the description has been made with reference to the embodiment of the present disclosure, it would be apparent to those skilled in the art that the present disclosure is not limited to the embodiment described above and various modifications may be made thereto. In the following descriptions, various modifications to the above-described embodiment will be described while focusing on differences between the embodiment and the modifications.

In the above-described embodiment, the controller 5 determines in the communication check process performed of S21 whether the controller 5 can read from the IC chip 51 at least one of the accumulated number of printed sheets, the accumulated number of rotations of the developing roller 30, and the accumulated consumption quantity of developing agent. However, in the communication check process of S21, the controller 5 may determine whether information other than the information described above can be read from the IC chip 51. Alternatively, in the communication check process of S21, the controller 5 may determine whether the controller 5 can write information into the IC chip 51.

Further, in the above-described embodiment, the controller 5 determines in the communication check process of S36 whether the controller 5 can write at least one of the accumulated number of printed sheets, the accumulated number of rotations of the developing roller 30, and the accumulated consumption quantity of developing agent into the IC chip 51. However, in the communication check process of S36, the controller 5 may determine whether the controller 5 can write other information into the IC chip 51. Further, in the communication check process of S36, the controller 5 may determine whether information can be read from the IC chip 51.

Further, in the above-described embodiment, the separation lever 91 and the counter-pressing member 93 of the drum cartridge 4 constitute the separation mechanism configured to move the casing 10 and the developing roller 30 of the developing cartridge 3 in the separating direction. However, the separation mechanism need not be limited to the configuration described above, and another configuration may be employed for the separation mechanism. Further, the separation mechanism may be provided in the main frame 2. In this case, the separation mechanism may be configured to press the casing 10 of the developing cartridge 3 in the separating direction without requiring mediation of the drum cartridge 4.

Further, in the above-described embodiment, the drum cartridge 4 including the photosensitive drums 80 is attachable to and detachable from the main frame 2. However, the photosensitive drums 80 may not be attachable to and detachable from the main frame 2. That is, the photosensitive drums 80 may be directly supported by the main frame 2. In this case, the developing cartridges 3 may be directly attached to the main frame 2 without being attached to the drum cartridge 4. Further, the electrical connectors 711 may be provided in the main frame 2.

Further, in the above-described embodiment, the IC chip 51 having the electrical contact surface 511 is fixed to the outer surface of the holder 52. However, only the electrical contact surface 511 for making contact with the electrical connector 711 may be fixed to the outer surface of the holder 52, and the remaining portion of the IC chip 51 other than the electrical contact surface 511 may be positioned at a position of the developing cartridge 3 different from the outer surface of the holder 52.

Further, detailed shape of each component constituting the image forming apparatus 1 may be different from that illustrated in the drawings. Further, components and processes appearing in the above embodiment and modifications may be suitably selected as long as any conflicting combination is avoided.

What is claimed is:

1. An image forming apparatus comprising:
a developing cartridge including:
a casing configured to accommodate developing agent therein;
a storage medium having an electrical contact surface; and
a developing roller movable together with the casing;
a photosensitive drum contactable with the developing roller;
an electrical connector contactable with the electrical contact surface;
a separation mechanism configured to move the developing roller between a first position in which the developing roller is separated from the photosensitive drum in a state where the electrical connector is in contact with the electrical contact surface and a second position in which the developing roller is in contact with the photosensitive drum in a state where the electrical connector is in contact with the electrical contact surface; and
a controller configured to control the separation mechanism, the controller configured to communicate with the storage medium via the electrical connector,
the controller being configured to perform:
moving, by controlling the separation mechanism, the developing roller between the first position and the second position; and
communicating with the storage medium via the electrical connector in a state where the developing roller is in the first position.

2. The image forming apparatus according to claim 1, wherein the developing cartridge further includes a holder holding the electrical contact surface, the holder being movable relative to the developing roller, and
wherein, when the controller performs the moving, the electrical contact surface and the electrical connector maintain contact with each other.

3. The image forming apparatus according to claim 1, further comprising a cover movable between an open position and a closed position,
wherein the controller is configured to further perform:
detecting whether the image forming apparatus is turned on or the cover moves to the closed position, and
wherein, when the controller detects in the detecting that the image forming apparatus is turned on or the cover moves to the closed position, the controller is configured to perform:
the moving; and
the communicating in response to performing the moving.

4. The image forming apparatus according to claim 3, wherein the storage medium is configured to store therein at least one of:
the accumulated number of printed sheets using the developing roller;
the accumulated number of rotations of the developing roller; and
an accumulated consumption quantity of the developing agent, and
wherein, in the communicating, the controller reads from the storage medium the at least one of the accumulated number of printed sheets using the developing roller, the accumulated number of rotations of the developing roller, and the accumulated consumption quantity of the developing agent.

5. The image forming apparatus according to claim 1, wherein the controller is configured to further perform:
printing using the developing cartridge,
wherein, after performing the printing using the developing cartridge, the controller is configured to perform:
the moving; and
the communicating in response to performing the moving.

6. The image forming apparatus according to claim 5, wherein the storage medium is configured to store therein at least one of:
the accumulated number of printed sheets using the developing roller;
the accumulated number of rotations of the developing roller; and
an accumulated consumption quantity of the developing agent, and
wherein, in the communicating, the controller writes into the storage medium the at least one of the accumulated number of printed sheets using the developing roller, the accumulated number of rotations of the developing roller, and the accumulated consumption quantity of the developing agent.

7. The image forming apparatus according to claim 1, wherein the controller is configured to further perform:
cleaning the photosensitive drum, and
wherein, when performing the cleaning, the controller is configured to perform:
the moving; and
the communicating in response to performing the moving.

8. The image forming apparatus according to claim 1, wherein the controller is configured to further perform:
printing using the developing cartridge; and
prohibiting, when determining that the communication with the storage medium is not established, the printing.

9. The image forming apparatus according to claim 1, further comprising a drum cartridge for use with the developing cartridge, the drum cartridge including the photosensitive drum.

* * * * *